United States Patent [19]

Yamaki et al.

[11] 4,073,866
[45] Feb. 14, 1978

[54] PROCESS FOR CONVERTING NITROGEN DIOXIDE INTO NITROGEN MONOXIDE

[75] Inventors: Naoomi Yamaki; Natsuko Futsuhara; Kazue Masuda, all of Kawaguchi; Koji Tsuchimoto, Ichikawa, all of Japan

[73] Assignee: Agency of Industrial Science and Technology of Japan, Tokyo, Japan

[21] Appl. No.: 733,162

[22] Filed: Oct. 18, 1976

[30] Foreign Application Priority Data

Nov. 15, 1975 Japan .................................. 50-137572

[51] Int. Cl.$^2$ ............................................. C01B 21/24
[52] U.S. Cl. .................... 423/405; 23/232 R; 252/443; 423/239
[58] Field of Search ............... 423/235, 405, 351, 239; 23/232 R; 252/443

[56] References Cited

U.S. PATENT DOCUMENTS

| | | | |
|---|---|---|---|
| 3,647,387 | 3/1972 | Benson et al. | 23/232 R |
| 3,730,686 | 5/1973 | Breitgobach et al. | 423/405 |
| 3,816,595 | 6/1974 | Lahaye et al. | 423/239 |
| 3,870,468 | 3/1975 | Nett | 423/351 |
| 3,919,397 | 11/1975 | Gould | 423/405 |
| 3,973,914 | 8/1976 | Heusden | 423/405 |

*Primary Examiner*—O. R. Vertiz
*Assistant Examiner*—Eugene T. Wheelock

[57] ABSTRACT

A process for converting nitrogen dioxide into nitrogen monoxide which comprises bringing a gas containing nitrogen dioxide into contact at a temperature ranging from 50° C to 400° C with a carbide of a metal selected from the group consisting of chromium, molybdenum, tungsten, vanadium, titanium, tantalum, silicon and boron or a composite carbide of such metals, thereby reducing nitrogen dioxide contained in the gas to nitrogen monoxide.

5 Claims, No Drawings

PROCESS FOR CONVERTING NITROGEN DIOXIDE INTO NITROGEN MONOXIDE

BACKGROUND OF THE INVENTION

The present invention relates to a process for selectively and quantitatively converting nitrogen dioxide ($NO_2$) in environmental atmosphere or exhaust from apparatus into nitrogen monoxide (NO) by reduction.

Nitrogen monoxide and nitrogen dioxide are main causative substances for forming photochemical smog, and hence the measurement of their concentrations in a precise manner is very important in a countermeasure for preventing air pollution.

For measurement of the above mentioned nitrogen oxides, an analyzer utilizing chemiluminescence is known (reference: Federal Register Vol. 36, No. 128, 1971). By the use of this analyzer, the concentration of nitrogen monoxide contained in environmental atmosphere or exhaust from apparatus can be measured precisely. For analysis of nitrogen dioxide, however, such analyzer necessitates the use of a converter capable of converting nitrogen dioxide into nitrogen monoxide. For such converter, carbon or a mixture of molybdenum oxide and carbon is used as reducing agent. However, a converter utilizing such reducing agent has such a drawback that it is effective only at high temperatures within a narrow range from 350° C to 450° C and such conditions apparently fail to make the conversion process efficient. Furthermore, there is an additional drawback that since the reducing agent used in this converter is influenced within such high temperature range by organonitrogen compounds such as peroxyacetyl nitrate and alkyl nitrates, it is impossible in the presence of such compounds to selectively and quantitatively convert nitrogen dioxide alone into nitrogen monoxide.

BRIEF SUMMARY OF THE INVENTION

Accordingly, it is a primary object of the present invention to provide a process for selectively and quantitatively converting nitrogen dioxide in a gas into nitrogen monoxide.

It is another object of the present invention to provide a process for selectively and quantitatively converting nitrogen dioxide into nitrogen monoxide by bringing a gas containing nitrogen dioxide into contact with a reducing agent at a low temperature.

It is still another object of the present invention to provide a process for selectively and quantitatively converting nitrogen dioxide in a gas into nitrogen monoxide even in the presence of ammonia or organonitrogen compounds without undergoing any substantial influence by them.

It is further object of the present invention to provide a converter which converts nitrogen dioxide selectively and quantitatively into nitrogen monoxide and is connected to a nitrogen monoxide analyzer.

Other objects, features and advantages of the present invention will be apparent more fully from the following description.

DETAILED DESCRIPTION OF THE INVENTION

As a result of extensive researches carried out to develop a process for selectively converting nitrogen dioxide into nitrogen monoxide at a lower temperature, it has now been found that nitrogen dioxide in a reaction gas can be converted selectively and quantitatively into nitrogen monoxide by passing the gas containing nitrogen dioxide through a certain type of a reaction composition which is mainly comprised of a metal carbide in which the metal and carbon are chemically bonded.

In accordance with the present invention, there is provided a process for converting nitrogen dioxide into nitrogen monoxide which comprises bringing a gas containing nitrogen dioxide into contact with a reaction composition comprised of a carbide of a metal selected from the group consisting of chromium, molybdenum, tungsten, vanadium, titanium, tantalum, silicon and boron or a composite carbide of such metals.

The above mentioned carbides used in the present invention are well known and can be manufactured by conventional methods, for example, by reacting one or more of the corresponding metals or metal compounds with carbon or hydrocarbons such as methane at a temperature of 1000°–2000° C, compression molding the resulting powder into an article in an appropriate form fit for a converter such as granules, plates of columns under a pressure of 50–1000 $kg/cm^2$ and then baking the molded article in hydrogen atmosphere at a temperature between 1300° C and 1700° C, desirably around 1500° C. Examples of the composite carbide include carbides of tungsten-titanium and tungsten-nickel.

The carbides used in the present invention selectively and quantitatively convert $NO_2$ in various kinds of gas into NO. The reaction may be carried out at an ordinary temperatrue, but is generally carried out within a proper temperature range of 100°–350° C. By this reduction reaction, $NO_2$ is converted into NO, and at the same time, the metal carbide is converted into carbon monoxide or carbon dioxide and a metal oxide. With the proceeding of the reaction, the metal carbide is gradually converted into oxides and finally all of the carbide is converted into oxides.

In practice of the present invention, the space velocity of the reaction gas can be varied within a wide range, but is generally within a range of 100–5000 GHSV (volume of gas/volume of the carbide/hour), preferably 300–3000 GHSV. The reaction temperature is within a range of 50°–400° C, preferably 100°–350° C. There is no limit in the content of $NO_2$ in the reaction gas, but the content is generally within a range of 0.01–200 ppm.

According to the present invention, it is possible to avoid substantially the undesirable influence of oxygen, ammonia and nitrates on the used carbide by appropriately adjusting the reaction temperature. For example, it is possible to avoid the reaction between oxygen and the carbide by lowering the reaction temperature below 400° C, expecially below 300° c. Also, the undesirable effect of ammonia can be avoided by lowering the reaction temperature below 250° C. Bad influence of organonitrogen compounds such as peroxyacetyl nitrate and alkyl nitrates can also be avoided by maintaining the reaction temperature between 100° C and 120° C. Thus, it is possible in the reaction composition of the present invention to control the influence of ammonia or organonitrogen compounds upon the amount of NO converted from $NO_2$ by changing the reaction temperature. It is therefore possible to make fractional determination of ammonia and organonitrogen compounds in addition to $NO_2$ by comparing the measured amount of NO under the influence of ammonia or organonitrogen compounds with the measured amount of NO free from such influence.

The carbides used in the present invention generally possess very high melting points above 2000° C, and therefore are excellent in thermal stability. They also excel in moldability and can easily be shaped into various porous molded articles without incorporating therewith any other material. Therefore, these carbides are very excellent as a reaction composition for $NO_2$ converters used in combination with conventional NO analyzers.

The present invention will now be explained in more detail by way of examples, but it is to be construed that the scope of the invention is not limited to these specific examples.

EXAMPLE 1

Various commercially available carbides tabulated below which were manufactured according to conventional methods (for example, by reacting various metals or metal compounds with methane or other carbon sources and molding the resulting powder by means of a compression molding machine) were baked at 1500° C for a few hours in hydrogen atmosphere and pulverized into granules having a particle diameter of 3–4 mm, 6 ml of which were placed in a reaction tube of 2 cm in diameter. Air containing 0.7 ppm of $NO_2$ and 0.1 ppm of NO was passed through the tube at ambient pressure with a gas hourly space velocity (GHSV) of 20000 $hr^{-1}$ whereby the rate of conversion of $NO_2$ in the air into NO was measured. The results obtained are shown in Table 1.

Table 1

| Exp. No. | Metal carbide | Reaction temperature (° C) | | | |
|---|---|---|---|---|---|
| | | 100 | 200 | 250 | 300 |
| 1 | Tungsten carbide | 96 | 99 | 99 | 99 |
| 2 | Molybdenum carbide | 96 | 97 | 99 | 99 |
| 3 | Chromium carbide | 93 | 99 | 96 | 94 |
| 4 | Tantalum carbide | 89 | 97 | 99 | 99 |
| 5 | Titanium carbide | 92 | 98 | 99 | 99 |
| 6 | Vandaium carbide | 89 | 95 | 98 | 99 |
| 7 | Boron carbide | 82 | 94 | 96 | 99 |
| 8 | Silicon carbide | 86 | 96 | 96 | 99 |

The tabulated results show that these 8 kinds of metal carbides possess a satisfactory conversion performance below the temperature (400° C) generally required for converter.

EXAMPLE 2

The warming-up time required before the eight kinds of metal carbides used in Example 1 obtain a stable rate of conversion was measured under the same conditions as described in Example 1. Table 2 shows 90% and 95% response times at 250° C.

Table 2

| Exp. No. | Metal carbide | Conversion rate (%) | Warming-up time (sec) | |
|---|---|---|---|---|
| | | | 90% | 95% |
| 9 | Tungsten carbide | 99 | 15 | 20 |
| 10 | Molybdenum carbide | 99· | 18 | 27 |
| 11 | Chromium carbide | 95 | 5 | 6 |
| 12 | Tantalum carbide | 99 | 13 | 21 |
| 13 | Titanium carbide | 99 | 70 | 140 |
| 14 | Vanadium carbide | 97 | 17 | 30 |
| 15 | Boron carbide | 96 | 15 | 40 |
| 16 | Silicon carbide | 96 | 9 | 12 |

The data show, besides that these metal carbides possess a high rate of conversion, that the warming-up time required until such high rate of conversion is stably maintained is short enough for practical purpose. This is an absolute requirement of a reaction composition for a converter.

EXAMPLE 3

Among the eight kinds of metal carbides used in Example 1 and 2, tungsten carbide, molybdenum carbide and chromium carbide were examined in both air and nitrogen atmosphere to measure their rates of conversion. The results obtained are shown in Table 3.

Table 3

| Exp. No. | metal carbide | Partial pressure of oxygen (%) | Reaction temperature (° C) | | |
|---|---|---|---|---|---|
| | | | 100 | 200 | 300 |
| 17 | Tungsten carbide | 0 | 97 | 99 | 99 |
| | | 21 | 96 | 99 | 99 |
| 18 | Molybdenum carbide | 0 | — | 96 | 99 |
| | | 21 | 96 | 97 | 99 |
| 19 | Chromium carbide | 0 | 97 | 99 | 96 |
| | | 21 | 93 | 99 | 96 |

The tabulated data show that the rate of conversion is little changed regardless of whether the gas used is nitrogen atmosphere or air containing 21% of oxygen. The rate of conversion seems to be slightly higher in the nitrogen atmosphere, thus being in agreement with the fact that the reaction proceeds more favorably in the presence of less oxygen in view of the chemical equilibrium or the reaction formula;

Thus, the character of the converter is influenced scarcely by the partial pressure of oxygen makes the converter particularly useful for measurement of $NO_2$ in exhaust gas in which the partial pressure of oxygen fluctuates.

The metal carbides used in Example 1 were examined at gas hourly space velocities of 1000, 2000 and 3000 $hr^{-1}$ to obtain the rate of conversion of $NO_2$ into NO at each space velocity. In these cases, the $NO_2$ concentration and other conditions adopted were the same as described in Example 1. As a result of the examination, the rate of conversion was found unchanged by decreasing or increasing the gas hourly space velocity.

EXAMPLE 5

To find the character of the converter according to the present invention, tungsten carbide, molybdenum carbide and tantalum carbide were examined at various concentrations of $NO_2$ (diluted with air) between 0.2 ppm and 10 ppm to obtain the rates of conversion in each case. Other conditions adopted are the same as described in Example 1.

As a result, there was found a quantitative relationship of 1:1 between the concentration of the introduced $NO_2$ and the concentration of the converted and measured NO within the tested range of $NO_2$ concentrations. This relation was found established within the temperature range of 180°–350° C.

It was confirmed that the quantitative relationship was established within a wider range of concentrations than was generally required for an environment monitoring nitrogen oxide analyzer, without influence of the introduced $NO_2$ on the rate of conversion, especially without adsorption of $NO_2$ at a low concentration.

EXAMPLE 6

The conversion characteristics of tungsten carbide, molybdenum carbide and chromium carbide at higher concentrations of $NO_2$ were measured as described in Example 5, using a gas diluted with nitrogen containing 50–100 ppm of $NO_2$. As a result of the measurement, it was confirmed that the rate of conversion of $NO_2$ at 250° C was at least 95% and was thus equivalent to the case of a lower concentration. At a low temperature below 200° C, however, the time for maintaining such a high rate of conversion was relatively short. It was found that a higher temperature (for example, a temperature within a range of 250°–280° C) should preferably be used when the concentration is high. Further, it was confirmed that when the conversion performance was reduced, the performance could be recovered by treating the reaction composition at 600° C for 2 hours in nitrogen atmosphere and that because the gas hourly space velocity of the converter actually used conjointly with the analyzer was about 1/20–1/100 of that used in this example, the converter was very useful also for measurement of $NO_2$ in exhaust gas.

EXAMPLE 7

When the converter is used as an environment monitor, it is important that the reaction composition not be consumed by oxygen and the rate of conversion not be influenced by $NO_2$. Because oxygen is present in a large quantity in comparison with $NO_2$, consumption of the reaction composition by oxygen will markedly shorten the life span of the converter. To confirm this, tungsten carbide was reacted with a reaction gas containing $NO_2$ diluted with helium and air released from a bomb, whereby the concentrations of carbon monoxide and carbon dioxide in the reaction gas were analyzed by the aid of a Beckmann analyzer Model 6800. As a result of the measurement, it was confirmed that tungsten carbide initiated the reaction with $NO_2$ at a low temperature below 100° C, but initiated the reaction with oxygen only at about 300° C.

These results indicate that at a temperature below 300° C, $NO_2$ alone reacts with tungsten carbide but oxygen does not. Therefore, consumption of the reaction composition by oxygen hardly takes place.

EXAMPLE 8

As another indispensable condition for the converter characteristics, it is important that the converter not be influenced by ammonia. To investigate this condition, a standard gas of ammonia diluted with air released from a bomb so as to have a concentration of 1 ppm of ammonia was brought into contact with a reaction composition in the same manner as described in Examples 1 and 2 and the concentration of the produced NO was measured. Tantalum carbide, molybdenum carbide and tungsten carbide were used as the reaction composition in this case. As a result of the investigation, it was found that each reaction composition was seldom affected by ammonia at a temperature below 250° C. Generally however, it cannot be said that the oxidation of ammonia does not take place at a temperature below 400° C. In some instances, at least 10% of ammonia was influenced. Many of the commercially available converters are operated at about 400° C. The above result makes it difficult to affirm that the oxidation of ammonia does not take place in such commercially available converters at that temperature.

EXAMPLE 9

An investigation was made to ascertain whether fractional determination of $NO_2$ and organonitrogen compounds (such as PAN) is possible or not by varying the temperature of the converter.

A photochemical reaction was carried out by introducing propylene and NO diluted with air into a stainless steel smog chamber with an internal capacity of 1058 l and irradiating it with ultraviolet rays. Using a tungsten carbide converter, the proceeding of this reaction was traced by measuring the concentration of $NO_2$ produced. In this reaction, $NH_3$ was scarcely formed.

Determination as to whether or not the measurement of $NO_2$ was influenced by organonitrogen compounds formed as photochemical reaction products was made by measuring $NO_2$ by the air of a secondary differential ultraviolet spectrophotometer (the UV method) simultaneously with the measurement of $NO_2$ using the above converter. Each experiment was made while setting the temperature of the converter at 200° C or 110° C. The following was noted as a result of these experiments. In the case of 200° C, the value obtained by using the converter became greater, after the production of $NO_2$ reached its peak, than that obtained by using the ultraviolet spectrophotometer and the difference between the two values grew greater with the lapse of time. In the case of 110° C, on the other hand, the value obtained by using the converter and that obtained by using the ultraviolet spectrophotometer were virtually equal even after the production of $NO_2$ reached its peak. The results indicate that in the former case (200° C) various organonitrogen compounds (such as nitrates) produced during the photochemical reaction are converted into NO in the converter and contribute to an increase in the measured value, while in the latter case (110° C) such a contribution to increase the measured value does not occur.

Therefore, an NO analyzer equipped with a converter using the reaction composition of the present invention can attain the simultaneous determination of organonitrogen compounds by using two converters operated at 150–250° C and 100°–120° C, respectively. Accordingly, such analyzer can be utilized for tracing the process of photochemical reactions.

Obviously many modifications and variations of the present invention are possible in the light of the above teachings. It is, therefore, to be understood that within the scope of the appended claims the invention may be practiced otherwise than as specifically described.

What is claimed is:

1. A process for selectively and quantitatively reducing nitrogen dioxide in a gas to nitrogen monoxide which comprises bringing a gas containing nitrogen dioxide into contact at a temperature within the range of 50°–400° C with a carbide of a metal selected from the group consisting of chromium, molybdenum, tungsten, vanadium, titanium, tantalum, silicon and boron or a composite carbide of said metals.

2. The process according to claim 1 wherein said gas is $NO_2$-polluted atmosphere.

3. The process according to claim 1, wherein said gas is an $NO_2$-containing exhaust gaseous effluent.

4. The process according to claim 1 wherein said gas contains nitrogen monoxide and organonitrogen compounds in addition to nitrogen dioxide.

5. The process according to claim 1, wherein said temperature range is 100°–350° C.

* * * * *